US00RE41210E

(19) United States
(12) Reissued Patent
Wang et al.

(10) Patent Number: US RE41,210 E
(45) Date of Reissued Patent: Apr. 6, 2010

(54) METHOD AND APPARATUSES FOR TRANSFERRING DATA FOR MULTIPLE APPLICATIONS THROUGH A SINGLE COMMUNICATION LINK IN RESPONSE TO AUTHENTICATION INFORMATION

(75) Inventors: Wu Wang, Los Altos, CA (US); Prasad Kongara, San Jose, CA (US)

(73) Assignee: FotoMedia Technologies, LLC, Portmouth, NH (US)

(21) Appl. No.: 11/593,125

(22) Filed: Nov. 3, 2006

Related U.S. Patent Documents

Reissue of:
(64) Patent No.: 6,085,249
Issued: Jul. 4, 2000
Appl. No.: 08/985,746
Filed: Dec. 5, 1997

U.S. Applications:
(63) Continuation-in-part of application No. 08/957,219, filed on Oct. 24, 1997, now Pat. No. 6,076,111.

(51) Int. Cl.
*G06F 15/16* (2006.01)

(52) U.S. Cl. ..... 709/229; 709/203; 709/227; 709/218; 709/232

(58) Field of Classification Search ..... 709/203, 709/227, 229, 217–218, 232; 726/3–4; 719/310
See application file for complete search history.

(56) References Cited

U.S. PATENT DOCUMENTS

| | | | | |
|---|---|---|---|---|
| 5,442,749 | A | | 8/1995 | Northcutt et al. |
| 5,560,008 | A | | 9/1996 | Johnson et al. |
| 5,608,874 | A | | 3/1997 | Ogawa et al. |
| 5,706,502 | A | | 1/1998 | Foley et al. |
| 5,708,780 | A | | 1/1998 | Levergood et al. |
| 5,710,883 | A | | 1/1998 | Hong et al. |
| 5,715,397 | A | | 2/1998 | Ogawa et al. |
| 5,745,360 | A | | 4/1998 | Leone et al. |
| 5,752,022 | A | | 5/1998 | Chiu et al. |
| 5,764,890 | A | | 6/1998 | Glasser et al. |
| 5,771,355 | A | | 6/1998 | Kuzma |
| 5,778,367 | A | | 7/1998 | Wesinger, Jr. et al. |
| 5,790,789 | A | | 8/1998 | Suarez |
| 5,793,966 | A | | 8/1998 | Amstein et al. |
| 5,802,299 | A | | 9/1998 | Logan et al. |
| 5,815,665 | A | | 9/1998 | Teper et al. |
| 5,841,432 | A | | 11/1998 | Carmel et al. |
| 5,845,070 | A | | 12/1998 | Ikudome |
| 5,845,084 | A | | 12/1998 | Cordell et al. |
| 5,860,068 | A | | 1/1999 | Cook |
| 5,862,346 | A | | 1/1999 | Kley et al. |
| 5,870,552 | A | | 2/1999 | Dozier et al. |
| 5,872,915 | A | | 2/1999 | Dykes et al. |
| 5,875,296 | A | | 2/1999 | Shi et al. |
| 5,890,170 | A | | 3/1999 | Sidana |
| 5,892,909 | A | | 4/1999 | Grasso et al. |
| 5,926,623 | A | | 7/1999 | Tsukakoshi et al. |
| 5,926,624 | A | * | 7/1999 | Katz et al. ..... 709/217 |
| 5,928,363 | A | * | 7/1999 | Ruvolo ..... 726/22 |
| 5,944,793 | A | * | 8/1999 | Islam et al. ..... 709/229 |
| 6,035,323 | A | | 3/2000 | Narayen et al. |
| 6,076,111 | A | | 6/2000 | Chiu et al. |
| 6,173,406 | B1 | * | 1/2001 | Wang et al. ..... 726/3 |
| 6,226,744 | B1 | * | 5/2001 | Murphy et al. ..... 726/5 |
| 6,377,691 | B1 | * | 4/2002 | Swift et al. ..... 380/277 |

* cited by examiner

*Primary Examiner*—Philip B Tran

(57) ABSTRACT

A method and apparatus for transferring data in response to authentication information. Authentication information is transmitted from a client computer to a server computer to authorize access to restricted data. Invocation information is transmitted from the server computer to the client computer in response to the authentication information. A first application is invoked in the client computer using the invocation information. The restricted data is then transmitted from the server computer to the first application program in the client computer based on the access authorized by the authentication information.

20 Claims, 11 Drawing Sheets

METHOD AND APPARATUSES FOR TRANSFERRING DATA FOR MULTIPLE APPLICATIONS THROUGH A SINGLE COMMUNICATION LINK IN RESPONSE TO AUTHENTICATION INFORMATION

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation-in-part of application Ser. No. 08/957,219 filed Oct. 24, 1997 *now U.S. Pat. No. 6,085,249*.

FIELD OF THE INVENTION

The present invention relates to methods and apparatuses for communicating data between data processing systems, and more particularly, to methods and apparatuses for communicating digital data between digital processing systems.

BACKGROUND OF THE INVENTION

It is often necessary or desirable to transfer data between data processing systems, such as digital processing systems. Typically, the transfer of data requires a modem or other interface to convert from the digital data on a digital processing system to data in other formats, such as analog formats. A typical example involves the use of a computer system with a modem at one location to transfer a data file from that computer system to a remotely located computer system which has its own modem or interface. The transfer of large data files, such as digital pictures, requires considerable time even with high-speed analog modems. The use of other types of modems is less common, although these modems do tend to improve the speed of file transfers between computer systems. Still, considerable time can be required to transfer large files even with these other types of modems.

Typically, the two computer systems establish a communication link and then one computer system begins sending a file or other data to the other computer system. Sometimes, the data is encrypted. Also, sometimes, a hashed or digested version of the file may be transferred with the file in order to allow the recipient of the file to authenticate the validity of the file as received at the second computer system.

These prior approaches to transferring data often result in the transmission of unnecessary data between the computer systems. As a result, considerable time can be spent transferring unneeded data. For example, a file could be transferred from a source computer system to a recipient computer system while that same file already exists on the recipient computer system as no attempt is made to determine whether the recipient already has the file. It should be noted that one solution may involve checking for the file name on the recipient system before sending the file; however, file names can be changed so that a check for the file name may not yield the correct answer. Moreover, even if the file names are not changed, it is still possible to have the same file names for different files by coincidence.

Thus it is desirable to provide a method and apparatus for eliminating the transfer of data between digital processing systems when the transfer is not necessary.

In some cases, after a first application program has been executed to establish a communication link between computer systems, it is desirable for a second application program to receive data transferred via the communication link. However, in certain types of communication protocols (e.g., transmission control protocol/internet protocol (TCP/IP)), each data packet transmitted across a communication link includes information identifying the application program used to initiate the communication link, and data received on the link is forwarded to the identified application program. As a result, even if a first application program has already established a communication link to a remote computer system, it is usually necessary for the second application program to establish its own communication link to the remote system to receive data. This results in wasted effort and can be particularly annoying to a computer-user that has already supplied, for example, authentication information in order to establish the link between the first application program and the remote computer system. Typically, the computer-user will have to re-enter the same identification information entered to establish the first link, and perform the same steps to authenticate the identification information as performed to authenticate the identification information entered to establish the first link.

Even when the communication protocol does not require information relating data packets to one another or information identifying a particular client application as the endpoint of a communication, an application-generated identifier may still be included in the payload of a data packet to establish that the packet is from a previously authenticated source. For example, in response to an authenticated request to download data, a server could generate a session identifier (e.g., a time-stamp and the requesting client's network address wrapped according to a predetermined format), supply the session identifier to the client application that issued the request and then require the client application to include the session identifier in other communications associated with the request. Because the session identifier is located in the payload and not in a header location defined by a particular protocol, it is difficult for other client applications (including those on other machines) to intercept the session identifier and masquerade as the original requester. While this makes the authenticated download operation somewhat more secure, it also makes it more difficult for a second client application to assume the communication session initiated by the first application. Again, the computer-user may have to re-enter identification information and re-authenticate the identification information before receiving requested download in a second application program.

What is needed is a method and apparatus for allowing the second application program to communicate with the remote computer system without having to re-enter identification or authentication information.

SUMMARY OF THE INVENTION

The present invention discloses methods and apparatuses for transferring data between digital processing systems.

A method in one example of the invention creates a first representation of a first digital media which is stored on a first digital processing system. The first representation is compared to a plurality of representations of a corresponding plurality of digital media. Typically, but not necessarily, the plurality of representations are stored on a second digital processing system, and the first representation is transmitted to the second digital processing system. The first digital media is transmitted to the second digital processing system if the first representation does not match any of the plurality of representations. Normally, the first digital media is transmitted to the second digital processing system only if the first representation does not match any of the plurality of representations.

In one example of the present invention, the representation represents the content as opposed to the file name of the digital media and the representation is derived from this content. In a typical embodiment, the digital media is a digital picture.

Computer systems which employ the methods of the present invention are described, and software which allows the computer system to perform the methods of the present invention is also described.

In various other embodiments of the present invention, a client computer transmits authentication information to a server computer to authorize access to restricted data. The server computer transmits invocation information to the client computer in response to the authentication information and the client computer invokes a first application program using the invocation information. The server computer transmits the restricted data to the first application program in the client computer based on the access authorized by the authentication information.

DETAILED DESCRIPTION

Figure 1:
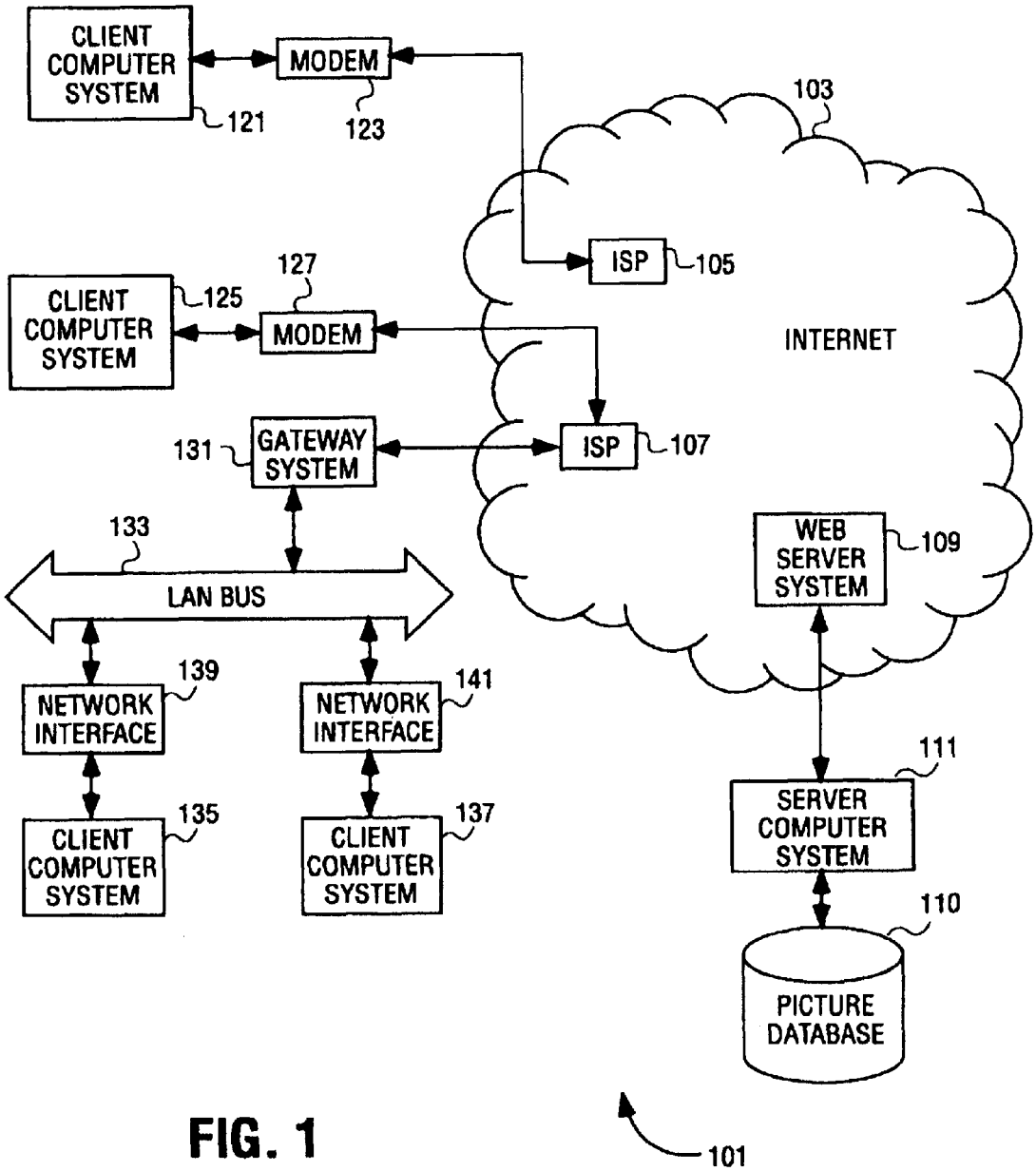
FIG. 1 shows an example of several client computer systems coupled to the Internet and a server computer system with a picture database according to one embodiment of the present invention.

The subject invention will be described with reference to numerous details set forth below, and the accompanying drawings will illustrate the invention. The following description and the drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail. In the drawings, the same element is labeled with the same reference numeral.

FIG. 1 shows several computer systems which are coupled together through the Internet. It will be appreciated herein that the term "Internet" refers to a network of networks which uses certain protocols (e.g. the TCP/IP protocol, and possibly other protocols such as HTTP for HTML documents). The physical connections of the Internet and the protocols and communication procedures of the Internet are well known to those in the art. Access to the Internet 103 is typically provided by Internet service providers (ISP), such as ISPs 105 and 107. Users on client computer systems, such as client computer systems 121, 125, 135, and 137 obtain access to the Internet 103 through the Internet service providers, such as ISPs 105 and 107. Access to the Internet allows users of the client computer systems to exchange information, receive and send e-mails and view documents, such as documents which have been prepared in the hypertext markup language (HTML) format. These documents are often provided by web servers, such as web server 109 which is considered to be "on" the Internet. Often, these web servers are provided by the ISPs, such as ISP 105, although a computer system may be set up and connected to the Internet without that system being also an ISP as is known in the art. The web server system 109 is typically at least one computer system which operates as a server computer system and is configured to operate with the protocols of the World Wide Web and is coupled to the Internet. Optionally, the web server 109 may be part of an ISP which provides access to the Internet for client systems. The web server 109 is shown coupled to the server computer system 111 which itself is coupled to a picture database 110. It will be appreciated that while two computer systems 109 and 111 are shown in FIG. 1, the web server system 109 and the server computer system 111 may be one computer system having different software components providing the web server functionality and the server functionality provided by server computer system 111, which will be described further below. Client computer systems 121, 125, 135, and 137 may each, with the appropriate web browsing software, view HTML pages provided by the web server 109. The ISP 105 provides Internet connectivity to the client computer system 121 through the modem interface 123 which may be considered part of the client computer system 121. The client computer system may be a "WINTEL" computer system, a network computer, a Web TV system, or other computer systems. Similarly, the ISP 107 provides Internet connectivity for client systems 125, 135, and 137, although as shown in FIG. 1, the connections are not the same for these three computer systems. Client computer system 125 is coupled through a modem interface 127 while client computer systems 135 and 137 are part of local area network (LAN). While FIG. 1 shows the interfaces 123 and 127 as a "modem," it will be appreciated that each of these interfaces may be an analog modem, ISDN modem, cable modem, satellite transmission interface (e.g. "Direct PC"), or other interfaces for coupling a computer system to other computer systems. Client computer systems 135 and 137 are coupled to a LAN bus 133 through network interfaces 139 and 141, which may be Ethernet or other network interfaces. The LAN bus is also coupled to a gateway computer system 131 which may provide firewall and other Internet related services for the local area network. This gateway computer system 131 is coupled to the ISP 107 to provide Internet connectivity to the client computer systems 135 and 137. The gateway computer system to 131 may be a conventional server computer system. Also, the web server system 109 may be a conventional server computer system.

Figure 2:
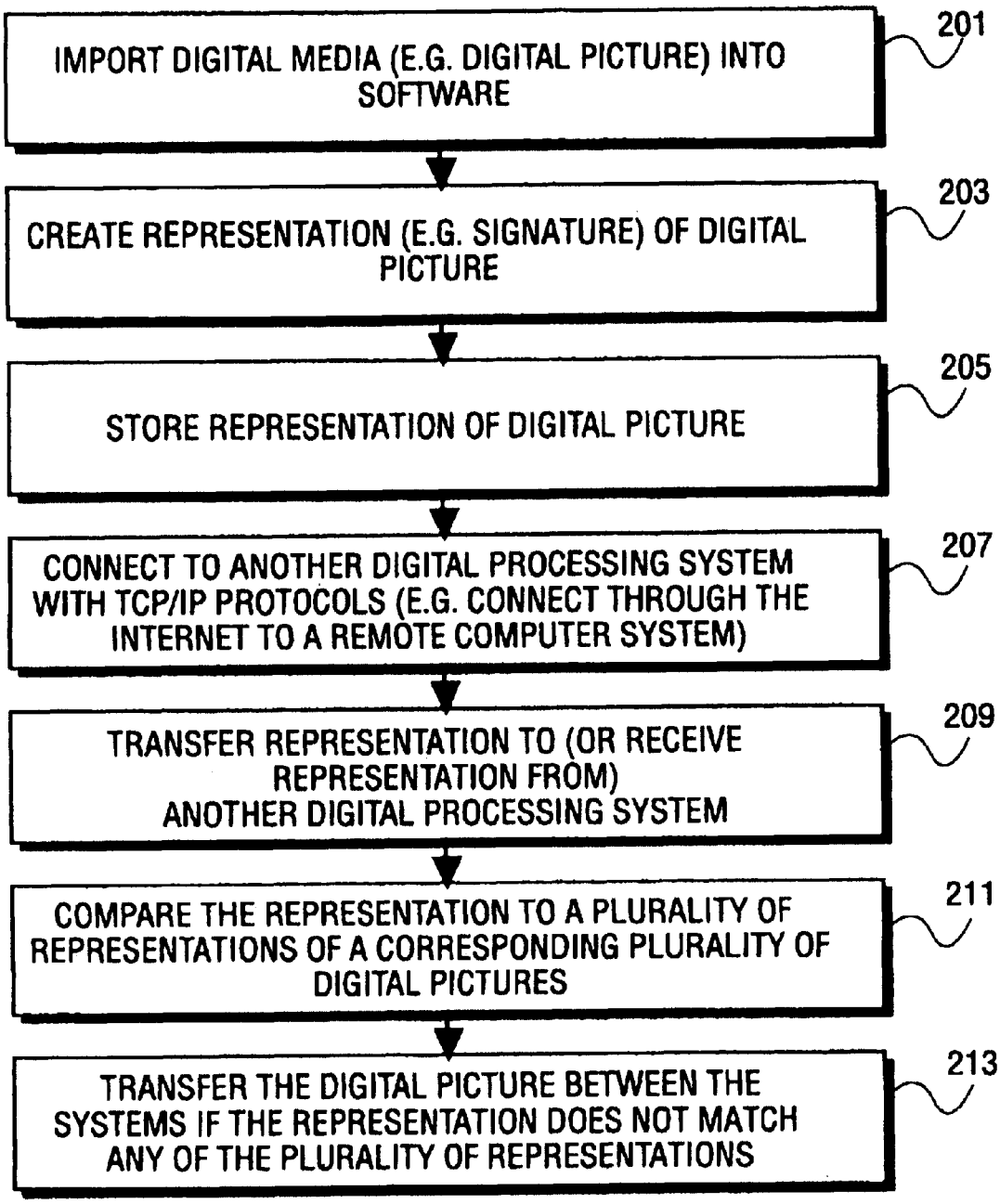
FIG. 2 shows an overview of one method according to one embodiment of the present invention.

One embodiment of the present invention will now be described by referring to FIG. 2 which shows this embodiment. The method of FIG. 2 begins in step 201 in which the user inputs a digital media into software running on a computer system. The digital media may be a digital picture. The computer system may be either a client computer system or a server computer system. In step 203, a representation, such as a signature, of the digital media is created. In one embodiment, this representation is a digest of the digital media; this digest may be created from conventional, commercially available software, such as the MD5 message digest algorithm from RSA Software of Redwood City, Calif. This representation represents the contents of the digital media as opposed to the file name or path name or other file system attributes of the digital media. However, it will be appreciated that the digest may include such attributes or file names in addition to the contents. This representation is derived from the contents of the digital media. It will be appreciated that this representation is not guaranteed to be unique; thus, it is appreciated that it is possible to generate the same representation for a different file or digital media although this is very unlikely. In one embodiment, a digital data stream for a digital picture is digested to produce 16 bytes of data which is the representation of the digital picture. It will also be appreciated that algorithms which provide a larger number of bytes will provide a higher probability of uniqueness.

In an alternative embodiment, the representation may be created by generating a histogram of the color distribution or other patterns of the digital data in the digital picture. Statistical computations may then be performed on this histogram to yield the reasonably unique representation of the picture based on the color distribution for the particular digital picture.

In step 205 the representation of the digital media, such as a digital picture, is stored on the computer system. It will also be appreciated that the original digital media is typically also stored on the same computer system or with the same computer system (e.g. on a network server which is coupled to the computer system).

In step 207, the computer system which created the representation then connects to another computer system. In one embodiment, this connection uses TCP/IP protocols to connect through the Internet to a remote computer system.

In step 209, the representation which was created on one computer system is transferred to another computer system. Alternatively, the computer system which created the representation could also receive at least one other representation from the other computer system. Then in step 211, the representation created in step 203 is compared to a plurality of representations of a corresponding plurality of digital media, such as digital pictures. In step 213, the digital media, such as the digital picture is transmitted between the systems if the representation does not match any of the plurality of representations as determined in the comparison step. In the example of FIG. 2, the system which creates the representation may actually perform the comparison by receiving the plurality of representations from the other digital processing system; however, it is expected that it will be preferred to transfer the representation to the other digital processing system which will compare the plurality of representations which are normally stored on the other digital processing system to the representation that has been transmitted to the other digital processing system. It will be understood that in step 213 no transmission of the digital media, such as the digital picture, will occur between the systems if the representation does match one of the plurality of representations. This will mean that transmission times are reduced because certain files or media do not have to be transferred between the systems. However, it is possible that the digital media should have been transferred because the media does not actually exist on the other computer system even though the representations match. However, this is unlikely particularly as the size of the representation increases as noted above.

Figure 3A:
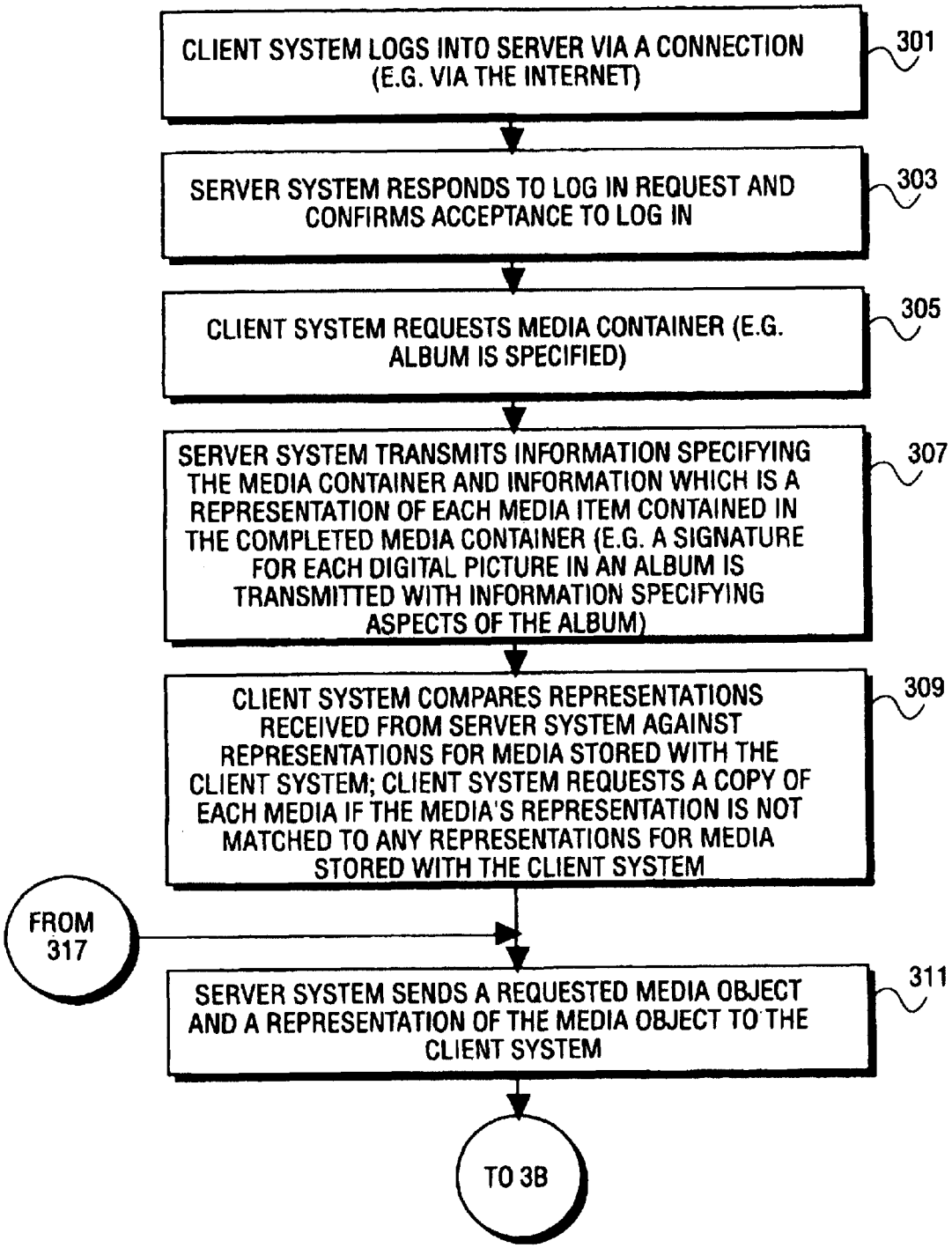
FIGS. 3A and 3B show a particular embodiment for downloading information from a server computer system to a client computer system.
Figure 3B:
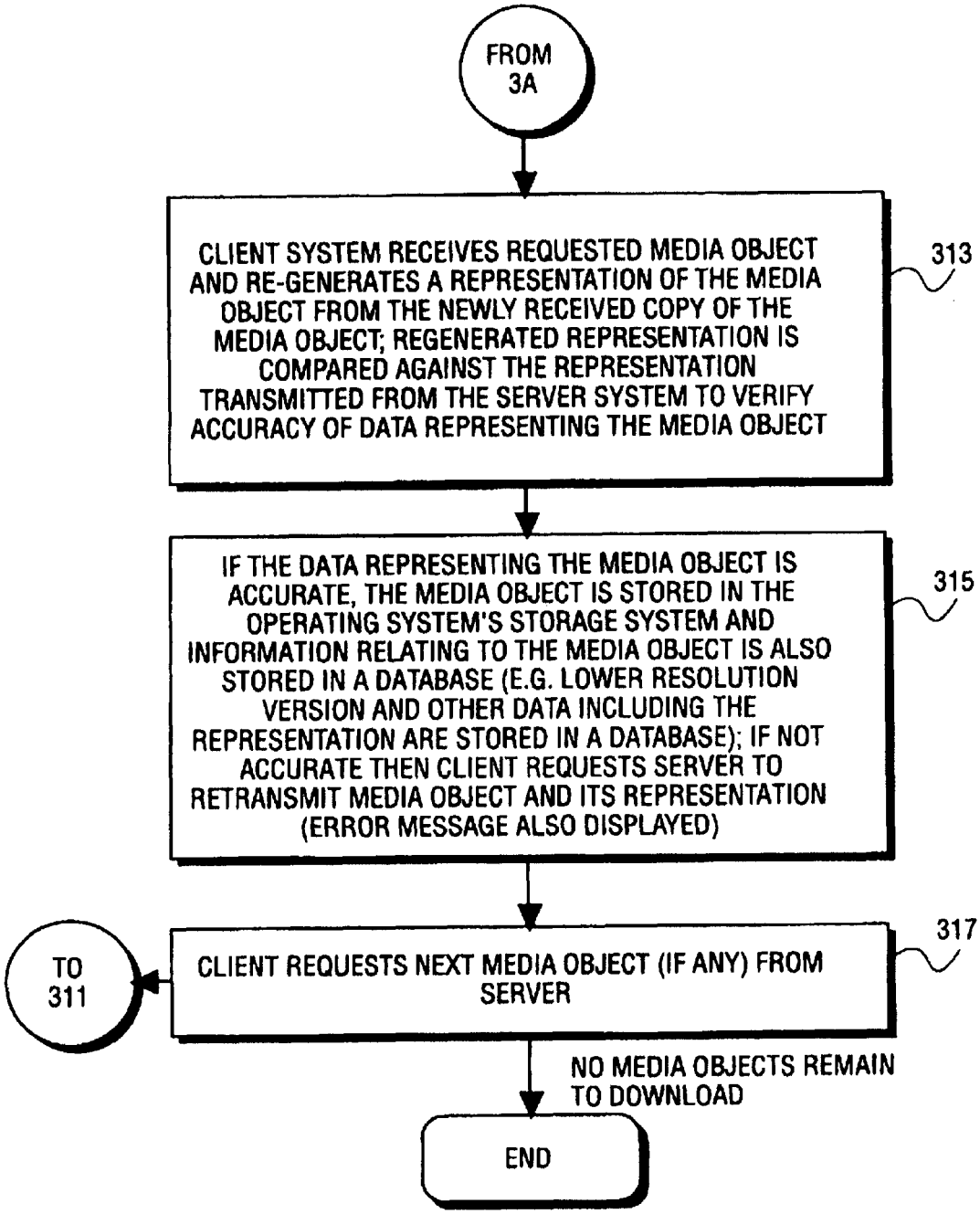

An example of a particular embodiment for downloading several digital media from a server system to client system is shown in the flowcharts of FIGS. 3A and 3B. In step 301, the client system logs into the server system via a connection; typically, this will be via the Internet. The server system in step 303 responds to the log in request and confirms acceptance to the log in. Typically, the log in request will require an identification of the user of the client computer system and may also require a password or some other authenticating data. In step 305, the client computer system requests a media container. In one particular example, the media container is a picture album which has a collection of pictures dispersed among multiple pages. Typically, there are several pictures on a page in the album and there are several pages in the picture album. In one embodiment, the client system is requesting the server to download a picture album from the server system. Referring to FIG. 1, a client computer system may be client system 121 and the server computer system may be server computer system 111 which is coupled to a picture database 110 which includes data relating to the media container, such as a picture album. The web server computer system 109 provides an interface between the client computer system 121 and the server computer system 111. In step 307, the server computer system, such as the server computer 111 transmits information specifying the media container and information which is a representation of each media item, such as a digital picture, contained in the assembled media container. In the example shown in FIG. 1, the server computer system 111 would transfer the information specifying the media container and the representations of each media item through the web server system 109 and the ISP 105 to the client computer system 121 or to other client computer systems. In a particular example of this method, a signature for each digital picture in the picture album is transmitted with the information which specifies aspects of the album. Aspects of the album which may be specified include the layout of the album which indicates the number of pages in the album and the number of pictures on each page and their location on each page. Digital data for the contents of the pictures is not yet transmitted. In step 309, the client system compares the representations received from the server system against representations from media stored with the client system. Typically, this media stored with the client system will be on a local hard disk or other mass storage device or may be on a server on a local area network to which the client computer system is coupled. In step 309, the client system requests a copy of each digital media if the media's representation is not matched to any representations for media stored with the client system. In this manner, the client computer system requests only copies from the server system of each media for which it does not already have a copy.

In step 311, the server system responds by sending a requested media object and a representation of the media object to the client system. The client system in step 313 receives the requested media object and regenerates a representation of the media object from the newly received copy of the media object. The regenerated representation is then compared against the representation transmitted in step 311 from the server system to verify the accuracy of the data representing the media object. Typically, a check sum of the regenerated representation may be compared against the check sum for the representation transmitted from the server system in step 311.

If the data representing the media object is accurate as indicated by matching check sums, then the media object is stored in operating system's storage system of the client system and information relating to the media object is also stored in a database which may be maintained on the client computer system. This database, in one embodiment, may include a lower resolution version of the media object, such as a digital picture, and other data including the representation for the media object. If the data representing the media object is not accurate (as indicated by check sums which do not match) then the client system requests the server system to retransmit the media object and its representation; an error message may also be displayed to the user of the client computer system. The user may also have an opportunity to prevent the retransmission or request for a retransmission. In step 317 the client system requests the next media object if any remains from the server and processing proceeds back to step 311 if further media objects have been requested by the client system. If no further objects remain to be downloaded then processing ends after step 317.

Figure 4A:
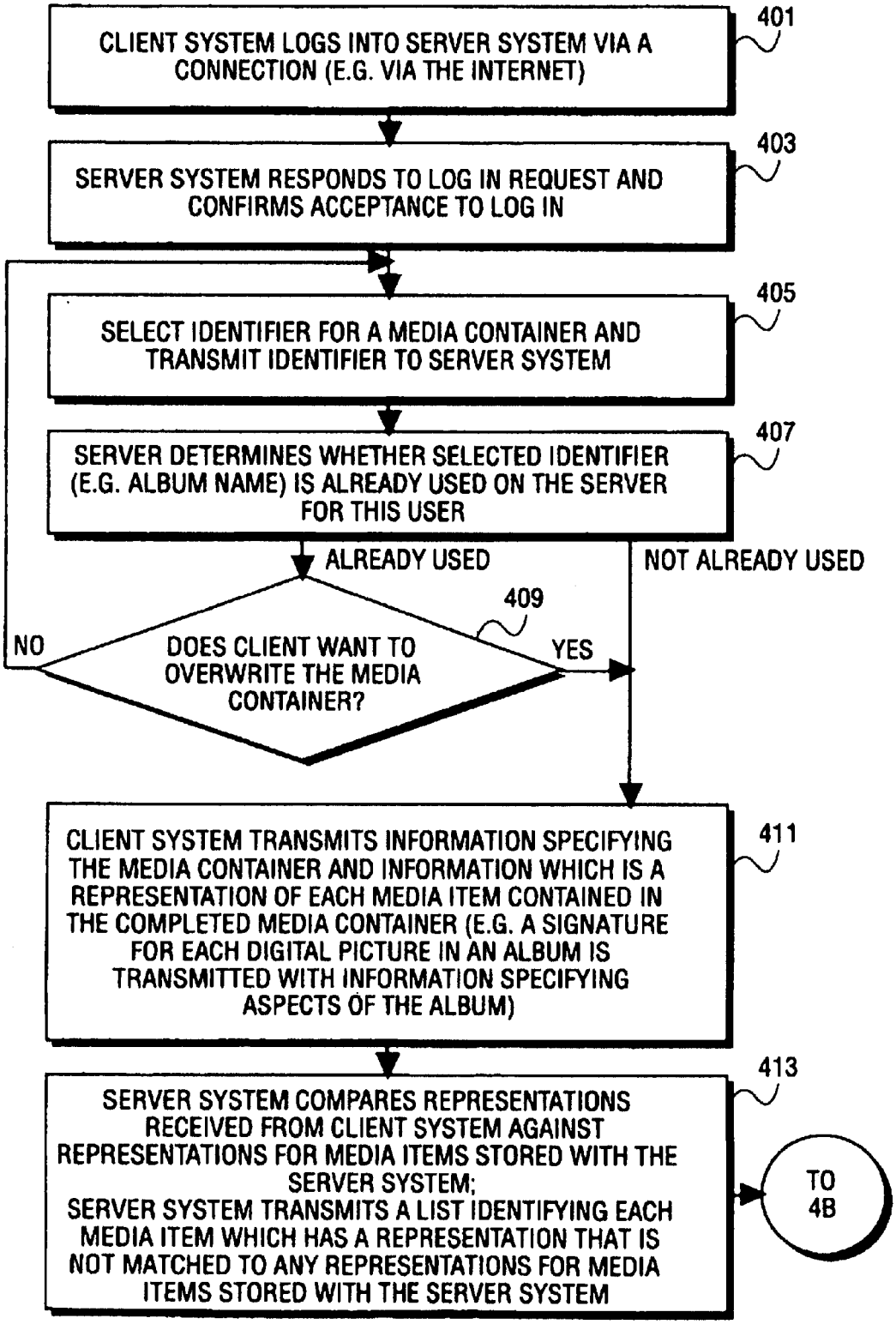
FIGS. 4A and 4B show one example of one embodiment of the present invention for uploading information from a client computer system to a server computer system.
Figure 4B:
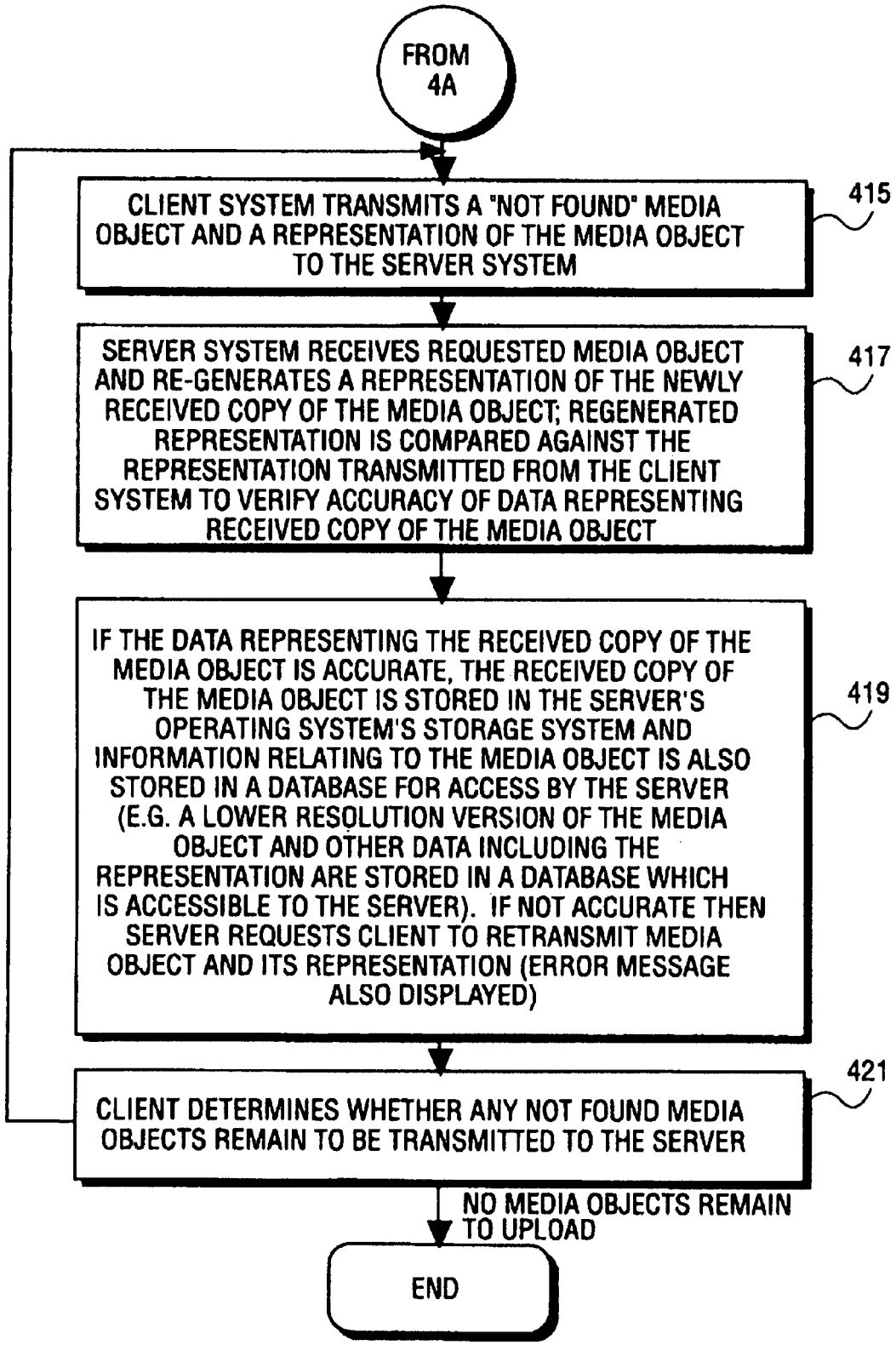

FIG. 4A and FIG. 4B are flowcharts illustrating a particular embodiment of the present invention in which a client system uploads digital media to a server computer system. Thus in the example shown in FIG. 1, digital media, such as several digital pictures in a picture album may be uploaded from client computer system 125 through the ISP 107 to the server system 111 through the web server 109 in order to "publish" the picture album on the web server 109. The web server 109 will then allow others to view the pictures in the album from a web browser. That is, users of other client systems, such as client computer system 121 or client computer system 135 may view the album with its associated pictures which is presented by the web server 109. Referring back to FIG. 4A, in step 401 the client system logs into the server system via a connection. In one embodiment, this connection is via the Internet. In step 403 the server system responds to the log in request from the client system and confirms acceptance to the log in. In one embodiment, the log in request may include the user's name or other identification and some password or other authentication of the user.

In step 405 the user at the client system selects an identifier for a media container, such as an album name for a picture album and transmits this identifier to the server system. The server system in step 407 determines whether the selected identifier, such as an album name, is already used on the server for this user. The server may maintain data for a number of different albums for a particular user and may also maintain other albums for other users. The server in step 407 determines whether the selected identifier identifies a particular album already being maintained on the server for this particular user. If the album is already being used or being maintained, then processing proceeds to step 409 in which the server returns a query to the client system. In this query, the client system is requested whether or not it wishes to overwrite the existing media container. That is, the user of the client system is requested to answer whether or not the media container, such as a picture album, is to be overwritten with new data. If in response to the query of step 409, the user indicates that the data is to be overwritten then processing proceeds from step 409 to step 411. If the user indicates in step 409 that the data is not to be overwritten then processing proceeds from step 409 back to step 405 and a message is displayed to the user requesting the user to select a name for a new media container. If in step 407 the server determines that the selected identifier is not already used (e.g. a new media container is to be created) then processing proceeds from step 407 directly to step 411.

In step 411, the client system transmits information specifying the media container and information which is a representation of each media item contained in the assembled media container. In one embodiment, the representation is a signature for each digital picture in a picture album, and this signature is transmitted with the information specifying aspects of the picture album. In step 413, the server system compares representations received from the client system against representations for media items stored with the server system. In one embodiment, referring back to FIG. 1, the server computer system 111 maintains a picture database for the particular user; this picture database is contained within database 110 and typically is for many users. The representations from the client system are transmitted through the web server system 109 to the server system 111 and these representations from the client computer system are compared against the representations for the media items stored with the server system for the user who logged in step 401. This comparison will indicate that a media item is already present on the server by showing a match between a representation transmitted from the client and a representation for the media item stored with the server system. The server system determines which media items are already present in the picture database 110 for the particular user and then transmits to the client system a list of each media item which is not present on the server system based upon determining that the media's representation transmitted from the client system is not matched to any representations for the media stored with the server system for the particular user. This list may be referred to as a "Not Found" list in that it indicates which media items were not found on the server system based on searching the media representations at the server. The list may additionally include a list of media items which were found at the server system (based upon a match between the respective representations). It will be appreciated that in an alternative embodiment the server system may compare the representations received from the client system to all representations for all users in the picture database 110.

In step 415, the client system transmits a media object on the "Not Found" list and a representation of this media object to the server system. The client system transmits each media item only if the representation for the media item is not stored with the server system. Thus the client system only transmits those media objects which are not already present on the server rather than transmitting all media objects which may be in an assembled media container, such as a fully assembled picture album. In step 417, the server system receives the transmitted media object and regenerates a representation from the newly received copy of the media object. This regenerated representation is compared against the representation transmitted from the client system in step 415 to verify the accuracy of the data representing the received copy of the media object. It will be appreciated that the regenerated representation may be compared against the representation transmitted from the client in step 411 rather than the representation transmitted in step 415.

If the data representing the received copy of the media object is accurate (e.g. as determined by comparing the check sum for the regenerated representation against the check sum of the representation transmitted from the client computer system in 415) then the received copy of the media object is stored in the server's operating system file storage system and information relating to the media object is also stored in a database for access by the server. Further details regarding storage of the various objects will be described with reference to FIGS. 6 and 7 below for a particular embodiment of the present invention. In one example, a lower resolution version of the media object and other data including the representation are stored in a database which is accessible to the server. This lower resolution version of the media object is often a web viewable image, such as a JPEG file which may be viewed in documents having the HTML format. If the data representing the received copy of the media object is not accurate, then the server requests the client to retransmit the media object and its representation and may also cause an error message to be displayed to the client's user. Optionally, the user may decide to not retransmit the media object.

Step 421 follows in which the client system determines if there are further media objects that are required to be transmitted from the client to the server as determined by the comparison step of step 413. If there are further media objects which need to be transmitted, then processing proceeds from step 421 back to step 415. If not further media objects need to be uploaded, then the process ends as shown in FIG. 4B.

Figure 5:
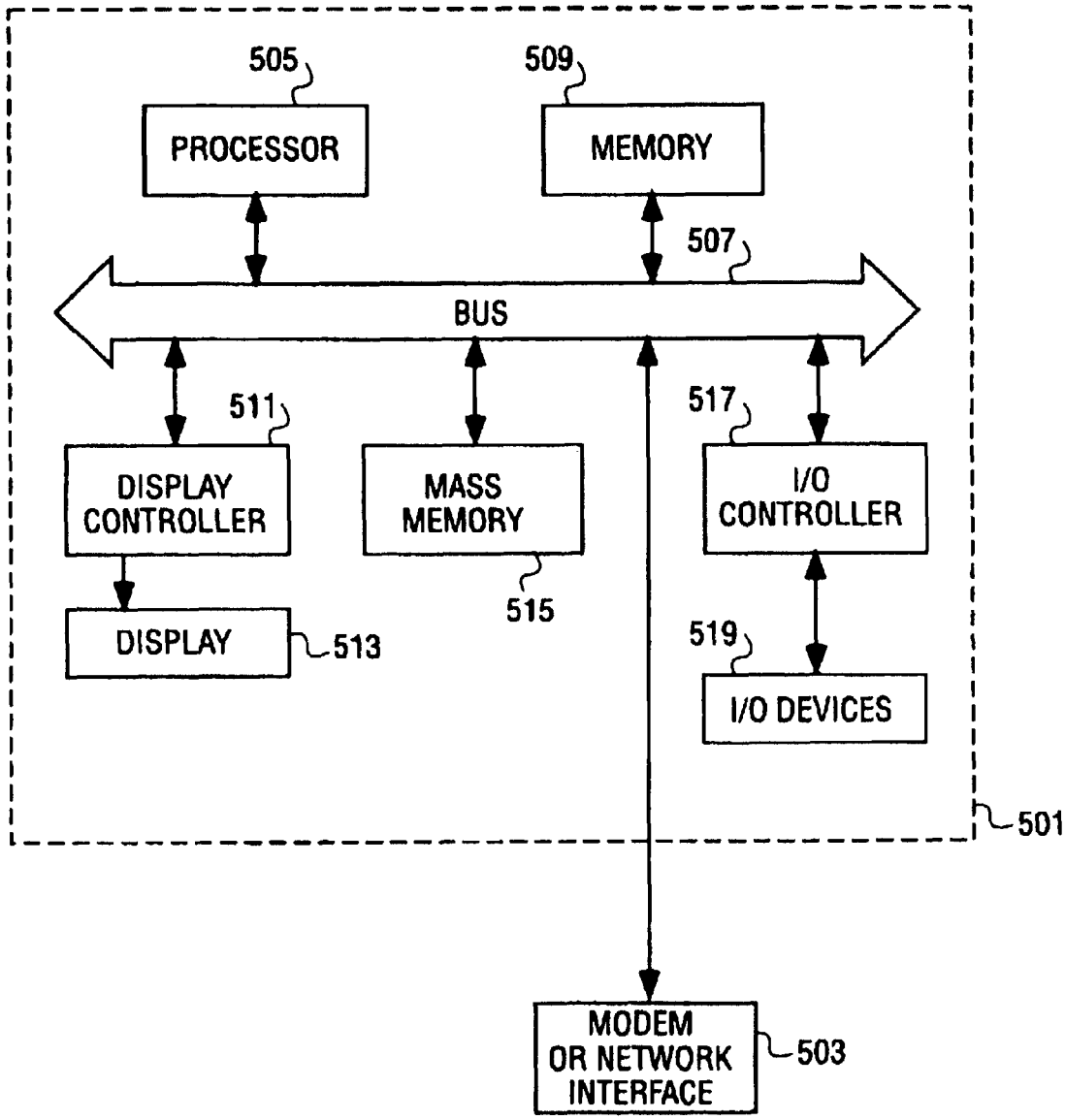
FIG. 5 shows an example of a computer system which may be used with the present invention.

FIG. 5 shows one example of a computer system which may be used as either a client computer system or a server computer system or as a gateway system or as a web server system. It will also be appreciated that such a computer system may be used to perform many of the functions of Internet service providers, such as ISP 105. The computer system 501 interfaces to external systems through the modem or network interface 503. It will be appreciated that the modem or network interface 503 may be considered to be part of the computer system 501. This interface 503 may be an analog modem, ISDN modem, cable modem, token ring interface, satellite transmission interface (e.g. "Direct PC"), Ethernet interface, or other interface for coupling a computer system to other computer systems. The computer system 501 includes a processor 505 which may be a conventional microprocessor, such as an Intel Pentium microprocessor or Motorola Power PC microprocessor. Memory 509 is coupled to the processor 505 by a bus 507. Memory 509 may be dynamic random access memory (DRAM) and may also include static RAM (SRAM). The bus 507 couples the processor 505 to the memory 509 and also to mass memory 515 and to display controller 511 and the I/O (input/output) controller 517. The display controller 511 controls display on a display device, such as a CRT or a liquid crystal display, shown generically as display 513. The input/output devices 519 may include a keyboard, disk drivers, printers, a digital camera, a scanner, and other input and output devices, including a mouse or other pointing device. Display controller 511 and the I/O controller 517 may be implemented with conventional well known technology. The mass memory 515 is often a magnetic hard disk, an optical disk, or another form of storage for large amounts of data which are often written, by a DMA process, into memory 509 during execution of software in the computer system 501. It will be appreciated that the computer system 501 is one example of many possible computer systems which have different architectures. For example, WINTEL systems (systems which run a Microsoft Windows operating system on an Intel microprocessor) often have multiple busses, one of which may be considered a peripheral bus. Network computers may also be considered to be a computer system which may be used with the present invention. Network computers may not include a hard disk or other mass storage, and executable programs are loaded from a network into memory 509 for execution by the processor 505. A Web TV system, which are known in the art, may also be considered to be a computer system according to the present invention, but it may not include certain features shown in FIG. 5, such as certain input or output devices. A typical computer system will usually include at least a processor, memory, and a bus coupling the memory to the processor.

Figure 6:
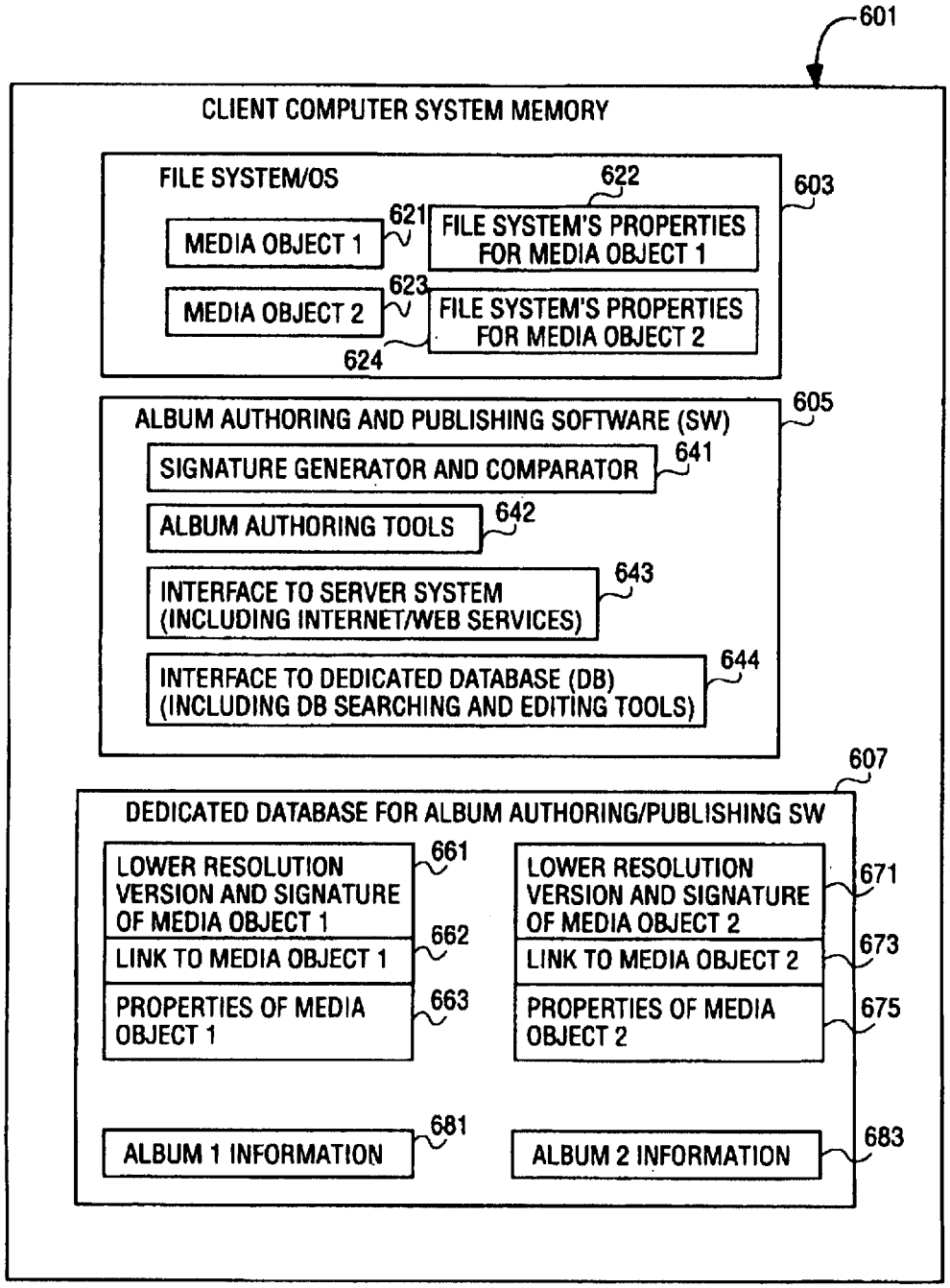
FIG. 6 shows an example of a computer readable storage medium for a client computer system which may be used with one aspect of the present invention.
Figure 7:
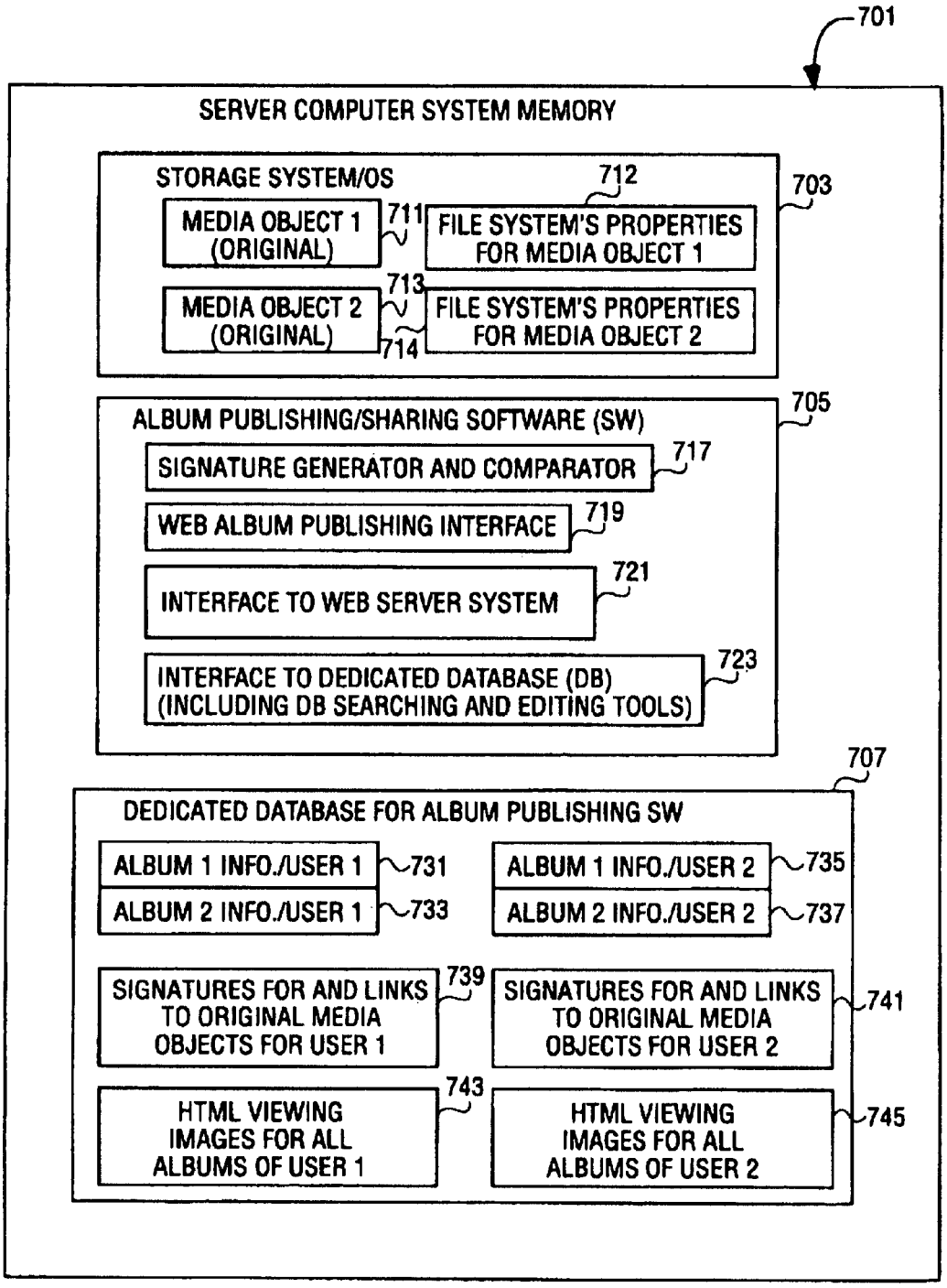
FIG. 7 shows a computer readable storage medium for a server computer system which may be used with one aspect of the present invention.

FIGS. 6 and 7 illustrate examples according to one embodiment of the present invention for two different computer readable storage media. It will be appreciated that the actual memory which stores this information may be different elements, such as the memory 509 and the mass memory 515 or they may be the same element, such as the mass memory 515. In one example of a network computer where there is no non-volatile mass memory, the necessary software files and data files may be downloaded to the memory 509 for execution in a processor in a network computer. In this case, the memory 509 provides the computer readable storage medium.

FIG. 6 illustrates an example of a computer readable storage medium containing various elements which are used with one embodiment of the present invention. The medium 601 includes a file system and an operating system (OS) element or module 603 which is used to control the file system for the client computer system as well as providing the operating system support such as the disk operating system and other aspects of the operating system. Another element is the album authoring and publishing software 605 which is used to create and modify albums and to interface with the server system in order to publish and/or share those albums. Another element is a dedicated database which is dedicated to the album authoring/publishing software. This database element 607 includes information for the various pictures in the various albums a user may create. While digital pictures represent one embodiment of the present invention, it will be appreciated that digital media or media objects refers generally to audio digital media, video digital media and software files, such as a word processing file created by a word processing computer program. However, the preferred embodiment is one in which the digital media or digital pictures are assembled into a picture album, where the album has multiple pages and where at least some of the pages include multiple pictures.

As shown in FIG. 6, the file system/OS element 603 includes media objects 621 and 623 which are the actual binary data of two different media objects, media object 1 and media object 2, stored on a hard disk or other media under control of the disk operating system. The disk operating system creates file system properties, such as properties 622 and 624 which specify various file system related properties for the two media objects. These include file size, date of creation, and document type (e.g. JPEG, BMP, etc.). The album authoring and publishing software element 605 includes four modules 641, 642, 643, and 644. The signature generator and comparator 641 is the executable computer program for generating and comparing the signatures or representations according to the present invention. The album authoring tools 641 allows a user to create a picture album by selecting layout information which specifies the number and location of pictures on a page throughout multiple pages of a picture album. The interface to server system module 643 includes Internet and web services allowing the client computer system which includes the computer readable memory 601 to interface with a server system, such as the server computer 111 of FIG. 1. The interface to dedicated database module 644 includes database searching and editing tools allowing the album authoring and publishing software to search and edit the dedicated database 607.

FIG. 6 shows an example of the dedicated database 607. It will be appreciated that data may be stored in other formats and ways in this database. As shown in FIG. 6, for each media object, there is stored in the database a lower resolution version of the digital picture as well as the signature of the media object and a link to the original (higher resolution)

media object as well as information indicating the properties of the media object. Thus, the lower resolution and signature of media object 1 is stored with a link to the original media object 621 stored in the file system as well as the properties of the media object 1, which properties are typically in addition to the file system's properties 622. Similarly, for media object 2, there is stored a lower resolution version, such as a thumbnail image, of the media object 2 and the signature or representation of the media object 2. There is also a link or pointer to the original media object 2 which is the media object 623 maintained by the file system. Further, there are properties for the media object 2 which are in addition to the properties 624. The database 607 further includes information specifying layout and other information for album 1, labeled as information 681, and information 683 specifies information for a second album which may include different pictures than album 1 or may include some of the same pictures as album 1.

In one embodiment, the client computer system's computer readable media 601 may at some time be entirely stored in non-volatile mass memory, such as a hard disk. At other times, the various elements shown in FIG. 6 may be dispersed between dynamic memory, such as memory 509, and a mass memory, such as mass memory 515.

FIG. 7 shows an example of the computer readable storage medium 701 which may be used with a server computer system of the present invention. This memory, which again may be dispersed among memory elements or may be stored entirely on a hard disk or other non-volatile storage media, includes three elements which are the file system/operating system element 703, the album publishing/sharing software 705, and the dedicated database for the album publishing software 707.

The file system and operating system element 703 includes the original, higher resolution media objects 1 and 2 shown as elements 711 and 713. These elements are the actual digital (or other) data of the media object stored on the computer readable medium under control of the file or storage system such as a disk operating system. The file storage system also stores properties which are the file system's properties for the media object, such as properties 712 and 714. These properties typically include the file's size for each media object as well as the date of creation, the date of last modification and the type of document. The album publishing/sharing software 705 includes a signature generator and comparator module which is responsible for generating representations or signatures of the media objects and to compare signatures or representations in accordance with the present invention. The web album publishing interface 719 performs functions relating to decoding information with respect to the albums and generating albums as a result of decoding the information specifying album format. The interface to web server system 721 is an optional software module which is used to allow the server computer system 111 to interface with the web server 109. Typically, some services are required in order to interface between the album publishing and sharing software and the software required for providing web server functionality. The interface to the dedicated database element 723 provides for database searching and editing of the dedicated database 707.

The dedicated database 707 includes information 731 for a first album of user 1 and information 733 for a second album of user 1. It also includes information 735 for a first album of a second user and information 737 for a second album of the second user. There is also stored in the database 707 the signatures for and the links to the original media object for the first user. This information may be stored in separate tables or together in one table. The links point back to an original media object, typically by picture name and full path name to the original media object, such as media object 711 as stored in the file or storage system of the server system. The signatures are used when comparing signatures received from the client system when connected with user 1 in the case of the signatures stored with element 739. Also for user 1, the database either stores or refers to a separate storage for the HTML viewing images for all albums of user 1. This element 743 is generated from the media object, such as the original media object 1 stored as element 711 in the file system. Typically, the HTML viewing images are a lower resolution version of the original media object and will be displayed to users when browsing the web server 109. The database 707 contains similar information, such as the elements 741 and 745 for the second user.

As discussed above, a web browser may be executed in a client computer system to view an album and associated pictures that are maintained on (or are accessible by) a web server. A web browser is an application program for navigating the World Wide Web ("the web"). The web may be thought of as a collection of HTML documents that are distributed across a world wide network of computers and that include hypertext links to one another. The individual HTML documents are referred to as "web pages" and may include various types of data (e.g., text, graphics, audio and video data). The hypertext links within a web page are phrases or graphical regions that are underlined, highlighted or otherwise made prominent when the web page is displayed. When a user selects a hypertext link (e.g., with a mouse or other pointer device), a specialized address (e.g., a uniform resource locator (URL)) associated with the hypertext link is used to access another web page indicated by the link. Because web pages frequently include hypertext links to web pages that are maintained on remote computers, following a trail of hypertext links is often referred to as navigating sites on the World Wide Web.

As discussed above, a web browser may be used to access web pages that contain digital media including digital photographs and other media arranged in a digital picture album that has previously been published on a web server. Because access to some of the digital picture albums may be restricted, it is often necessary for the web browsing user to authenticate his or her identity before being able to view images in an album or download an album. This authentication may take place in a number of ways, including using the MD5 message digest algorithm discussed above.

In one embodiment of the present invention, a web browser may be used to initiate a download of a published digital picture album, including a restricted-access picture album and the digital media and formatting information contained therein. However, because web browsing applications are usually not designed to interpret album formatting information, it is desirable to cause the downloaded data to be received in another application program that is designed to interpret the album formatting information such as an album authoring and publishing application (e.g., an executing instance of the album authoring and publishing software described above). A significant difficulty that must be overcome to allow a download operation to be initiated by a web browser, but completed by downloading data to another application is that the communication link established between the web browser (executed on a client computer) and the server computer typically specifies the web browser as the recipient of downloaded data. Even if the communication link does not specify the web browser as the recipient of downloaded data, a session identifier known only to the web browser and the server computer may be required in the payload of each data packet associated with the download request. While the user could quit the web browsing application and then initiate establish a new communication link using the album authoring and publishing application, this would be inconvenient—especially if the user has already supplied authentication information to the web server using the web browsing application (e.g., a message digest created using a key value known to the user and to the web server).

Figure 8A:
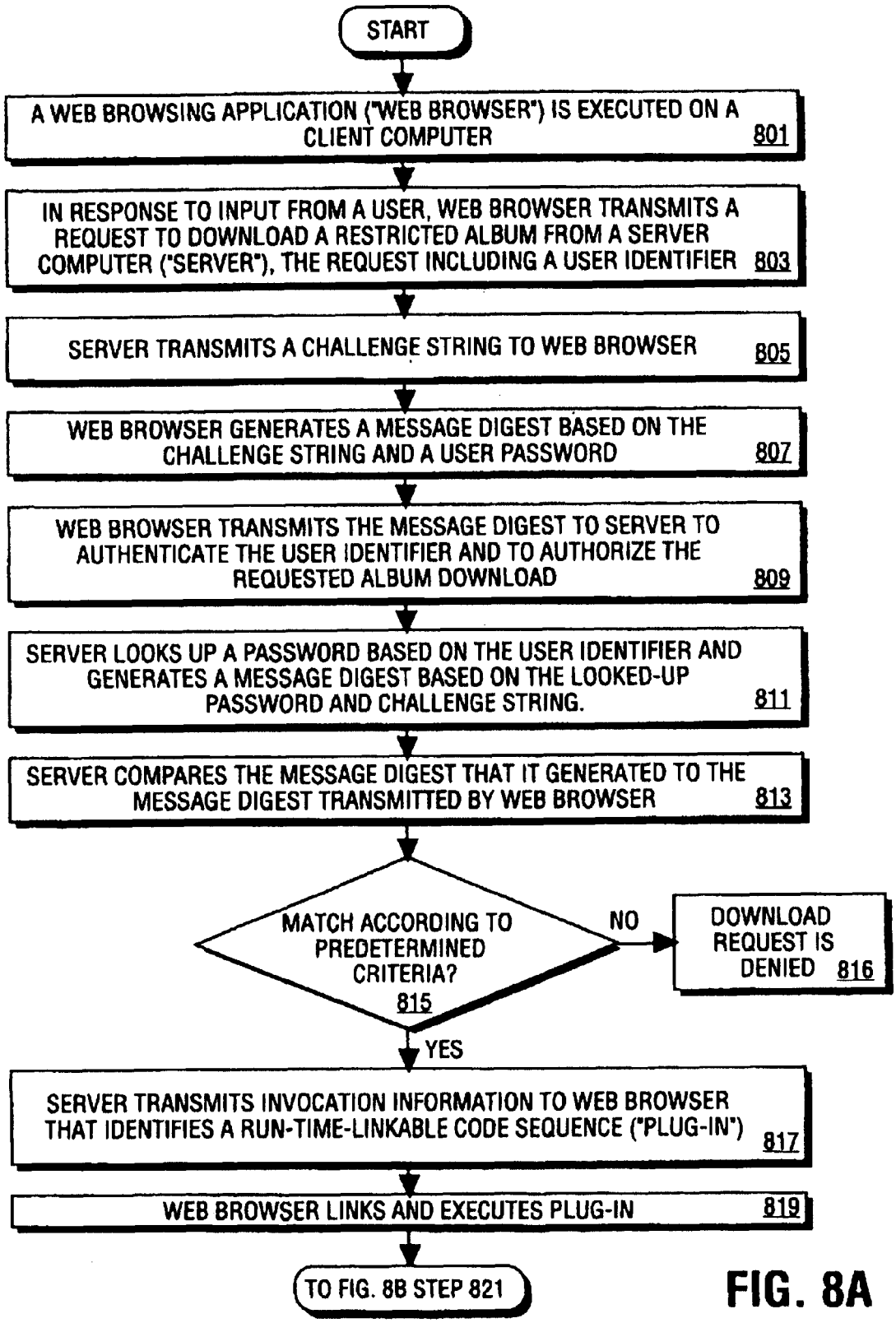
FIGS. 8A and 8B show a method for downloading data according to one embodiment of the present invention.
Figure 8B:
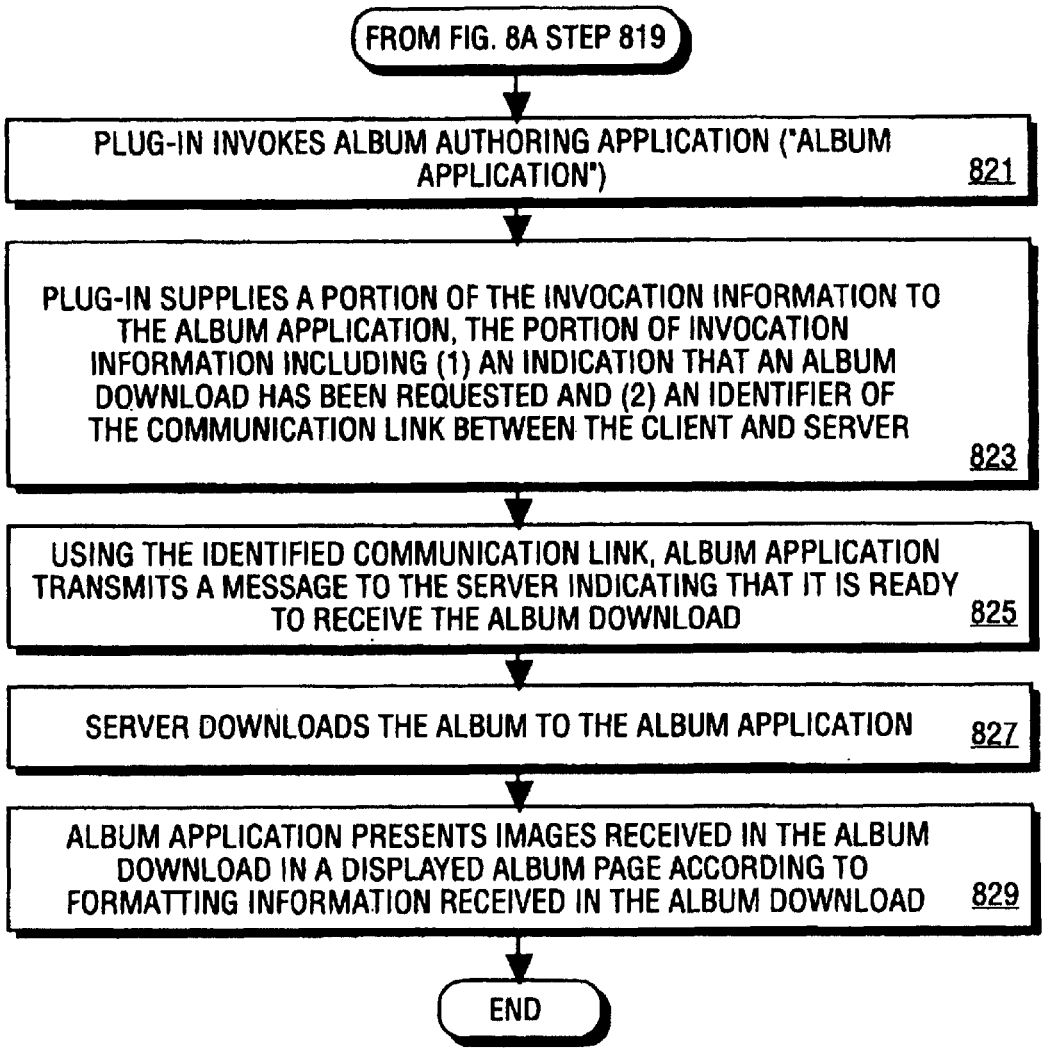

FIGS. 8A and 8B illustrate a generalized method for downloading data according to one embodiment of the present invention. At step 801, a web browser is executed on a client computer. In response to user-input, the web browser transmits a request to download an album from a server (e.g., a web server) at step 803. If access to the album is restricted, the request may include one or more values identifying the user (e.g., the name of the user). In response to the request to download data, the server transmits a challenge string to the web browser at step 805. In one implementation, the challenge string is a relatively short, random set of values that can be used to create a message digest. The web browser generates a message digest based on the challenge string and a user password or other key value at step 807. The web browser transmits the message digest to the server at step 809 to authenticate the one or more values transmitted in step 803 to identify the user. At step 811, the server looks up a password (or other key value) based on the user identifier and generates a message digest based on the looked-up password and the challenge string. At step 813, the server compares the message digest generated in step 811 to the message digest transmitted by the web browser in step 809. If, at decision step 815, the message digests match (e.g., the message digests are the same or, when added, the sum of the digests is zero, etc.) execution of the method proceeds to step 817. Otherwise the download request is denied at step 816.

Assuming that the message digests match, then, at step 817, the server transmits invocation information to the web browser that identifies a run-time linkable sequence of program code called a "plug-in". In one embodiment, the plug-in may be a dynamic-link library (DLL) module that is named by the invocation information and located in a mass storage directory established by configuration of the browser application. In alternate embodiments, the plug-in may be a spawned application program or a function invoked by a remote procedure call (RPC). Generally, any technique for invoking execution of program code that extends the capabilities of the web browser is within the spirit and scope of the present invention.

At step 819, the web browser links and executes the plug-in. In one embodiment, the plug-in, when executed, invokes the album authoring and publishing application discussed above (the "album application") at step 821. At step 823, the plug-in supplies a portion of the invocation information to the album application including (i) an indication that album download has been requested and (ii) an identifier of the communication link between the client and server established by the web browsing application. For example, the identifier of the communication link may be a session identifier generated by the server computer in response to authentication of the download request. By requiring the client computer to include the session identifier in further communications associated with the download request, the server computer can determine that those communications pertain to the previously authenticated request. The communication link is thus identified by the presence of the session identifier in each transmitted data packet.

In one embodiment, the session identifier includes a timestamp (e.g., indicating the time the request is authenticated) and the network address of the client. Different information may be included in the session identifier in other embodiments. Generally, any information that may be used to uniquely identify the authenticated download request may be included in the session identifier.

Instead of (or in addition to) a session identifier, the identifier of the communication link may include a network address for the client and server computers and port numbers allocated respectively to the web browser application and an application on the server computer that is used to handle download requests. In a network that communicates using TCP/IP protocols, a port number and network address are used to uniquely identify a communication endpoint, such as a web browsing application.

Because the album application has been supplied with the information necessary to continue communications pertaining to the download request initiated by the web browser, the album application does not have to initiate a new communication link to the server. This is particularly advantageous in the situation where, as here, the user has previously entered identification and authentication information to allow access to restricted data on a server. Thus, at step 825, the album application transmits a message to the server indicating that it is ready to receive the album download (e.g., digital pictures and album formatting information). If the communication link is identified by a session identifier, then the album application will include the session identifier in the message transmitted in step 825. At step 827, the server receives the request from the album application and downloads the album to the album application. In an embodiment that uses a session identifier, the server will confirm the presence of a correct session identifier in the request from the album application before downloading the restricted data. At step 829, the album application displays an album page and presents images or other information received in the album download (e.g., digital pictures) in the album page according to formatting information received in the album download. For example, the formatting information may include information indicating positions on respective album pages at which digital pictures or other information is to be displayed, the size of regions used to display the digital pictures or other information, the background color and texture of the album pages, text to be displayed adjacent regions of the album pages and so forth.

The foregoing description has provided numerous examples of the present invention. It will be appreciated that various modifications and changes may be made thereto without departing from the broader spirit and scope of the invention as set forth in the appended claims. Further details concerning particular embodiments of the present invention may also be found in the following co-pending patent applications which were filed on the same date as this application and which are hereby incorporated herein by reference; these co-pending applications are as follows: "Methods and Apparatuses for Acquiring a Digital Image for Use in a Digital Processing System" by inventors James Lei and Wu Wang; and "Methods and Apparatuses for Distributing Digital Media over a Digital Network" by inventors Shantanu Narayen, Wu Wang, Steve Morris, Chan Chiu, Cecilia Zhao, Aditya Khosla, James Lei, and Prasad Kongara.

What is claimed is:

1. A method comprising:

transmitting authentication information from a client computer to a server computer to authorize access to restricted data, wherein transmitting authentication information further includes executing a web browsing application program in the client computer to transmit the authentication information to the server computer;

transmitting invocation information from the server computer to the client computer in response to the authentication information, *the invocation information including a link identifier that defines a communications link between the server computer and the web browsing application, wherein the link identifier comprises at least one of a session identifier and a combination including a port number for the web browsing application and a network address*;

invoking a first application program in the client computer using the invocation information, said first application program being a different application from said web browsing application program; and transmitting the restricted data from the server computer to the first application program in the client computer based on the access authorized by the authentication information *through the communications link defined by the invocation information*.

2. The method of claim 1 further comprising the server computer generating [a] *the* session identifier in response to the authentication information.

3. The method of claim 2 wherein the transmitting of invocation information includes transmitting the session identifier to the client computer.

4. The method of claim 3 further comprising transmitting a request including the session identifier to the server computer after the first application program has been invoked, the request requesting download of the restricted data to the first application program.

5. The method of claim 4 further comprising the server computer confirming the presence of the session identifier before transmitting the restricted data to the first application program.

6. The method of claim 1 wherein the transmitting of authentication information includes transmitting a first message digest generated using a first key value.

7. The method of claim 6 further comprising the server computer:

generating a second message digest using a second key value;

comparing the first message digest and the second message digest; and authorizing access to the restricted data if the first message digest and the second message digest match according to a first criteria.

8. The method of claim 1 wherein the transmitting of invocation information includes transmitting one or more parameters that identify a portion of executable code that is dynamically linked to the web browsing application program, and wherein the invoking a first application program includes executing the portion of executable code to invoke the first application program and to send a message to the first application program to cause the first application program, when executed, to receive the restricted data from the server computer.

9. The method of claim 1 further comprising automatically displaying a plurality of images included in the restricted data in predetermined regions of a display.

10. The method of claim 9 wherein the predetermined regions of the display are indicated by positioning data included in the restricted data.

11. The method of claim 9 wherein the predetermined regions of the display are regions of a page of a digital photo album.

12. The method of claim 1 wherein the communicating of authentication information from a client computer to a server computer includes communicating the information to the server computer via communication links between a plurality of networks of computers, the plurality of networks of computers including a first network of computers that includes the server computer and a second network of computers that includes the client computer.

13. A method comprising:

executing a web browsing application program in a client computer to transmit authentication information to a server computer;

transmitting the authentication information to the server computer to authorize the server computer to return restricted data;

receiving invocation information from the server computer, *the invocation information including a link identifier that defines a communications link between the server computer and the web browsing application, wherein the link identifier comprises at least one of a session identifier and a combination including a port number for the web browsing application and a network address*;

invoking a first application program in the client computer based on the invocation information, said first application program being a different application from said web browsing application program; and receiving the restricted data from the server computer in the first application program *through the communications link defined by the invocation information* without transmitting further authentication information to the server computer.

14. An article of manufacture including one or more computer-readable media having stored thereon program code sequences, the program code sequences including program code which, when executed by a processor, causes the processor to:

execute a web browsing application program to transmit authentication information to a server computer;

transmit authentication information to the server computer to authorize access to restricted data;

request the server computer to transmit the restricted data;

receive invocation information from the server computer, *the invocation information including a link identifier that defines a communications link between the server computer and the web browsing application, wherein the link identifier comprises at least one of a session identifier and a combination including a port number for the web browsing application and a network address*;

invoke a first application program based on the invocation information, said first application program being a different application from said web browsing application program; and receive the restricted data from the server computer in the first application program based on the access authorized by the authentication information *through the communications link defined by the invocation information*.

15. The article of claim 14 wherein the invocation information includes [a] *the* session identifier generated by the server computer in response to the authentication information.

16. The article of claim 15 wherein the program code sequences further include program code which, when executed by the processor, causes the processor to issue a request including the session identifier to the server computer after the first application program has been invoked, the request requesting download of the restricted data to the first application program.

17. The article of claim 14 wherein the authentication information includes a first message digest that can be compared by the server computer to the second message digest to authenticate the identity of a computer user.

18. The article of claim 14 wherein the program code sequences further include program code which, when executed by the processor, causes the processor to display a plurality of images included in the restricted data in predetermined regions of a display.

19. The article of claim 18 wherein the predetermined regions of the display are indicated by positioning data included in the restricted data.

20. The article of claim 18 wherein the predetermined regions of the display are regions of a page of a digital photo album.

* * * * *

UNITED STATES PATENT AND TRADEMARK OFFICE

CERTIFICATE OF CORRECTION

PATENT NO. : RE 41,210 E
APPLICATION NO. : 11/593125
DATED : April 6, 2010
INVENTOR(S) : Wu Wang It is certified that error appears in the above-identified patent and that said Letters Patent is hereby corrected as shown below:

Column 17, line 8, the phrase, "computer to the second" should read --computer to a second--

Signed and Sealed this

Thirteenth Day of July, 2010

David J. Kappos

David J. Kappos
*Director of the United States Patent and Trademark Office*